(12) United States Patent
Jayaraman et al.

(10) Patent No.: US 8,745,207 B2
(45) Date of Patent: *Jun. 3, 2014

(54) SYSTEM AND METHOD FOR MANAGING COMPUTER APPLICATIONS RUNNING AMONG COMPUTING SYSTEMS BASED ON THEIR RESOURCE USAGE VOLATILITY

(75) Inventors: Bhaskar Jayaraman, Karnataka (IN); Brian D McKean, Longmont, CO (US)

(73) Assignee: LSI Corporation, Milpitas, CA (US)

(*) Notice: Subject to any disclaimer, the term of this patent is extended or adjusted under 35 U.S.C. 154(b) by 824 days.

This patent is subject to a terminal disclaimer.

(21) Appl. No.: 12/836,587

(22) Filed: Jul. 15, 2010

(65) Prior Publication Data
US 2012/0016990 A1 Jan. 19, 2012

(51) Int. Cl.
*G06F 9/50* (2006.01)
*H04L 29/06* (2006.01)

(52) U.S. Cl.
USPC .......................................................... 709/224

(58) Field of Classification Search
CPC ..... G06F 9/5027; G06F 9/505; G06F 1/3203; G06F 3/061; G06F 9/0544; G06F 11/079; G06F 11/3466; G06F 2201/865; G06F 2201/88; G06F 2209/504; H04L 67/16; H04L 63/10; H04L 47/125

USPC .......................................................... 709/224
See application file for complete search history.

(56) References Cited

U.S. PATENT DOCUMENTS

| | | | |
|---|---|---|---|
| 8,291,411 B2 * | 10/2012 | Beaty et al. | 718/1 |
| 2008/0172672 A1 * | 7/2008 | Logan et al. | 718/104 |
| 2008/0295096 A1 * | 11/2008 | Beaty et al. | 718/1 |
| 2009/0037922 A1 | 2/2009 | Herington | |
| 2011/0173329 A1 * | 7/2011 | Zhang et al. | 709/226 |

* cited by examiner

*Primary Examiner* — Karen Tang
(74) *Attorney, Agent, or Firm* — Prakash Nama; Global IP Services, PLLC

(57) ABSTRACT

A system and method for managing computer applications running among computing systems based on determined risk of resource saturation is disclosed. In one embodiment, a volatility of resource usage for each computing system is computed based on computed resource usage gains/losses associated with each computing system. A current resource usage of each computing system is then determined. Further, a risk of resource saturation is determined by comparing the computed volatility of resource usage with the determined current resource usage of each computing system. The computer applications running among the computing systems are then managed using the determined risk of resource saturation associated with each computing system.

15 Claims, 5 Drawing Sheets

| TIME 202 | MEMORY USAGE 204 | LN (VALUE AT X+Δ / VALUE AT X) 206 | CPU USAGE 208 | LN (VALUE AT X+Δ / VALUE AT X) 210 | I/OS PER SECOND 212 | LN (VALUE AT X+Δ / VALUE AT X) 214 |
|---|---|---|---|---|---|---|
| X | 28% | | 24.2% | | 28.25% | |
| X+Δ | 28.5% | 1.77% | 24.8 | 2.45% | 27.58% | -2.40% |
| X+2xΔ | 27% | -5.41% | 25.15 | 1.40% | 27.42% | -0.58% |
| X+3xΔ | 27.5% | 1.83% | 25.5 | 1.38% | 27.25% | -0.62% |
| X+4xΔ | 29% | 5.31% | 25.65 | 0.59% | 27.08% | -0.63% |
| X+5xΔ | 28% | -3.51% | 25.92 | 1.05% | 26.86% | -0.82% |
| MEAN | | -.002% | | 1.374% | | -1.01% |
| STDEV – VOLATILITY | | 3.90% | | 0.61% | | 0.69% |

Figure 3:
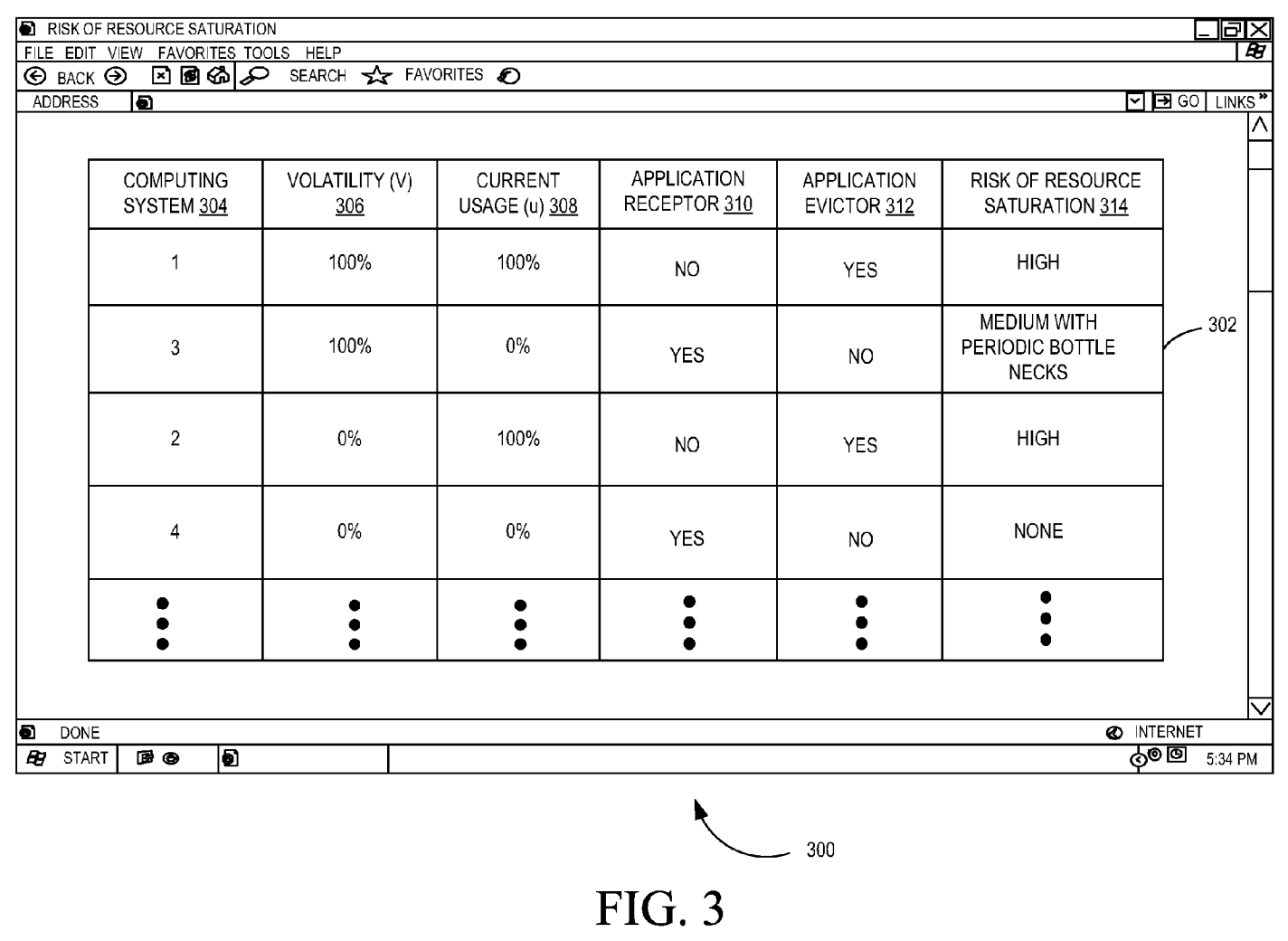

| COMPUTING SYSTEM 304 | VOLATILITY (V) 306 | CURRENT USAGE (u) 308 | APPLICATION RECEPTOR 310 | APPLICATION EVICTOR 312 | RISK OF RESOURCE SATURATION 314 |
|---|---|---|---|---|---|
| 1 | 100% | 100% | NO | YES | HIGH |
| 3 | 100% | 0% | YES | NO | MEDIUM WITH PERIODIC BOTTLE NECKS |
| 2 | 0% | 100% | NO | YES | HIGH |
| 4 | 0% | 0% | YES | NO | NONE |
| ... | ... | ... | ... | ... | ... |

SYSTEM AND METHOD FOR MANAGING COMPUTER APPLICATIONS RUNNING AMONG COMPUTING SYSTEMS BASED ON THEIR RESOURCE USAGE VOLATILITY

BACKGROUND

Typically, performance of computing systems is measured in terms of usage of its resources, such as central processing unit (CPU), input/output (I/O), memory and the like. Peak usage of a computing system's resources in a data center usually happens at different times and many times they can be random and unpredictable. An increase or decrease in the usage of a computing system's resources can affect the performance of applications running on it and these applications need to be managed reliably for maintaining optimum performance, i.e., applications running among computing systems in data centers or on partitioned computing systems.

Very often, this assured reliability and management of applications on the computing systems are governed by service level agreements (SLAs) and the applications in turn typically demand a certain set of resources on any computing system to be able to run reliably. For example, a user may assign one or more computer applications on computing systems based on SLAs, which may not require all of the assigned resources to run the computer applications. This can result in underutilizing the assigned computing systems due to resource under utilization on the assigned computing systems. In contrast, the user can also assign applications on computing systems containing less than required resources, which can result in the risk of over utilization of computing resources and significantly affect performance.

BRIEF DESCRIPTION OF THE DRAWINGS

Various embodiments are described herein with reference to the drawings, wherein:

FIG. 2 illustrates a table, in the context of the present subject matter, including a typical statistical usage pattern of computing systems' resources;

FIG. 3 illustrates a graphical user interface (GUI) including a table that can be used in managing the computer applications running among the computing systems, according to one embodiment;

The drawings described herein are for illustration purposes only and are not intended to limit the scope of the present disclosure in any way.

DETAILED DESCRIPTION

A system and method for managing computer applications running among computing systems based on resource usage volatility is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
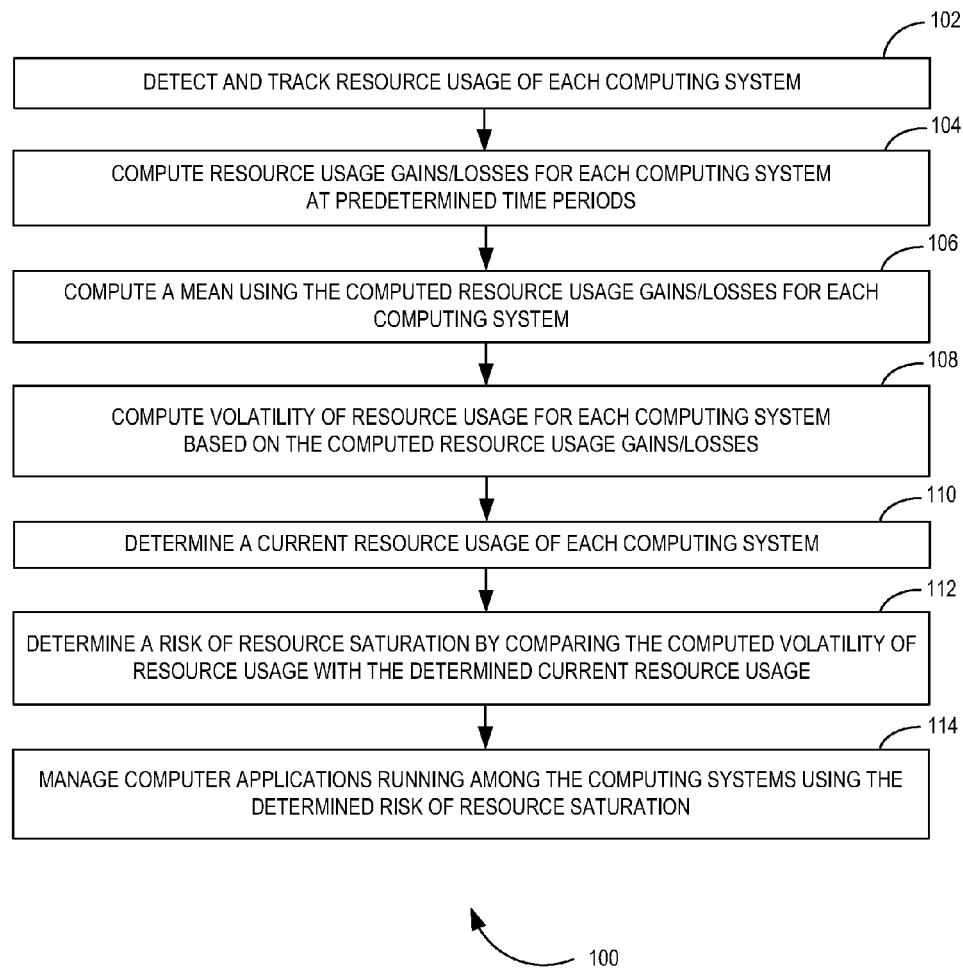
FIG. 1 illustrates a computer implemented flow diagram of an exemplary method for managing computer applications running among computing systems based on resource usage volatility, according to one embodiment.

FIG. 1 illustrates a computer implemented flow diagram 100 of an exemplary method for managing computer applications running among computing systems based on resource usage volatility, according to one embodiment. The computing systems may be part of exemplary networked computing environments, such as data centers, cloud computing systems, partitioned computing systems, storage systems, storage networks, individual disk drives, and the like. The partitioned computing system refers to a logical partitioned system or a virtual machine under a hypervisor or emulator. A computer application may be an application running in an operating system environment, or on bare computer hardware devoid of an operating system. A computer application also implies an operating system that can run in a hardware virtualized environment or a software based virtualization such as in a hypervisor or a hosted environment.

At step 102, resource usage of each computing system is detected and tracked. For example, data associated with resource usage are collected at predetermined time periods and are entered in a table (e.g., the table 200 of FIG. 2). The predetermined time periods may range from a smallest unit of time that a clock on the each computing system can provide to the maximum unit that a user (e.g., a system administrator) wishes to consider.

At step 104, resource usage gains/losses for each computing system is computed at predetermined time periods based on the detected and tracked resource usage. At step 106, a mean is computed using the computed resource usage gains/losses for each computing system at predetermined time periods. At step 108, the volatility of resource usage for each computing system is computed based on the computed resource usage gains/losses. It should be noted that the computed resource usage gains/losses, the computed mean, and the computed volatility of resource usage associated with each computing system are recorded in the table to analyze a typical statistical usage pattern of the computing systems' resources.

At step 110, a current resource usage of each computing system is determined. At step 112, a risk of resource saturation is determined by comparing the computed volatility of resource usage with the determined current resource usage of each computing system. According to an embodiment of the present subject matter, the computed volatility of resource usage, the current resource usage and the determined risk of resource saturation are entered in a table (e.g., the table 302 of FIG. 3) and may be displayed to the user in a GUI. At step 114, the computer applications running among the computing systems are managed using the determined risk of resource saturation associated with each computing system. For example, the user may analyze the table in the GUI and manage the computer applications among the computing systems based on the resource usage.

FIG. 2 illustrates a table 200, in the context of the present subject matter, including a typical statistical usage pattern of the computing systems' resources. Particularly, the table 200 includes the resource usage gains/losses computed at predetermined time periods, the computed mean and the computed volatility of resource usage associated with each computing system. In one embodiment, by analyzing the statistical usage pattern from the table 200, a risk of resource saturation in each computing system is determined and accordingly, the user may manage the computer applications running among the computing systems.

As shown, the table 200 includes a time field 202, a memory usage field 204, a natural logarithm (LN) field 206 associated with memory usage, a CPU usage field 208, a LN field 210 associated with CPU usage, an I/Os per second field 212 and a LN field 214 associated with the I/Os per second. It can be seen from the table 200 that, the predetermined time periods are of equal intervals such as X, X+Δ, X+2Δ, X+3Δ, X+4Δ and X+5Δ. The resource usage gains/losses associated with the memory, the CPU and the I/Os per second over the predetermined time periods are entered in the memory usage field 204, the CPU usage field 208 and the I/Os per second field 212 respectively. The resource usage gains/losses are computed by detecting and tracking resource usage in each computing system.

Further, LN of the resource usage gains/losses associated with the memory, the CPU and the I/Os per second over the predetermined time periods are entered in the LN field 206, the LN field 210 and the LN field 214 respectively. For example, the LN is calculated for a value at X+Δ/value at X. The table 200 also includes a mean which is computed using the resource usage gain/loss associated with the memory, the CPU and the I/Os per second. Further, standard deviations of the resource usage gains/losses associated with the memory, the CPU and the I/Os per second are computed and are entered in the table 200 as shown.

In one embodiment, the calculated standard deviation corresponds to the volatility of resource usage in the computing system. For example, the volatility is a measure of a degree of variability of usage of each resource in the computing system and determines a likelihood of resource saturation. The standard deviation may be calculated based on short term or long term historical data, or a combination. A low standard deviation indicates that all data points are very close to the mean value, while a high standard deviation indicates that the data points are "spread out" over a large range of values. Based on user needs, the value of standard deviation could either slide to a next set of values or the standard deviation may be computed cumulatively.

As shown in the table 200, the standard deviation associated with memory usage is 3.90%, with CPU usage is 0.61% and with I/O usage is 0.69%. It should be noted that, the resource having standard deviation tending to zero is the most stable resource and hence less volatile while the resource having standard deviation not tending to zero is the most unstable resource and hence volatile.

FIG. 3 illustrates a GUI 300 including a table 302 that can be used in managing the computer applications running among the computing systems, according to one embodiment. Particularly, the GUI 300 enables the user to select a computing system for moving in, moving out or running the computer applications. As illustrated, the table 302 includes a computing system field 304, a volatility field 306, a current usage field 308, an application receptor field 310, an application evictor field 312, and a risk of resource saturation field 314.

The volatility field 306 displays volatility of resource usage in the computing system which corresponds to the computed standard deviations. The current usage field 308 displays a current resource usage of the computing systems. The application receptor field 310 displays whether or not the computing systems are application receptors. The application evictor field 312 whether or not the computing systems are application evictors. The risk of resource saturation field 314 displays a risk of resource saturation in the computing systems based on the volatility of resource usage and the current resource usage.

As shown in the table 302, volatility associated with a computing system 1 is 100% and current resource usage in the computing system 1 is also 100%. Accordingly, the computing system 1 is not an application receptor. Hence, the risk of resource saturation associated with the computing system 1 is high. The volatility associated with a computing system 3 is 100% and current resource usage in the computing system 3 is 0%. Accordingly, the computing system 3 is an application receptor and the risk of resource saturation associated with the computing system 3 is medium with periodic bottlenecks.

Further, as shown in the table 302, volatility associated with a computing system 2 is 0% and current resource usage in the computing system 2 is 100%. Accordingly, the computing system 2 is not an application receptor and the risk of resource saturation associated with the computing system 2 is high. Also, as shown in the table 302, volatility associated with a computing system 4 is 0% and current resource usage in the computing system 4 is 0%. The computing system 4 is an application receptor and hence there is no risk of resource saturation associated with the computing system 4.

The user may analyze the table 302 in the GUI 300 and manages the computer applications running among the computing systems. For example, the user may move in new computer applications, move out the computer applications, or run the computer applications in the computing system based on the determined risk of resource saturation associated with each of the computing systems. The user may also consider application requirements during managing the computer applications. In one embodiment, the managing of the computer applications running among the computing systems may be automated. Also, based on the statistical usage pattern analysis, each of the computing systems can be valued.

Figure 4:
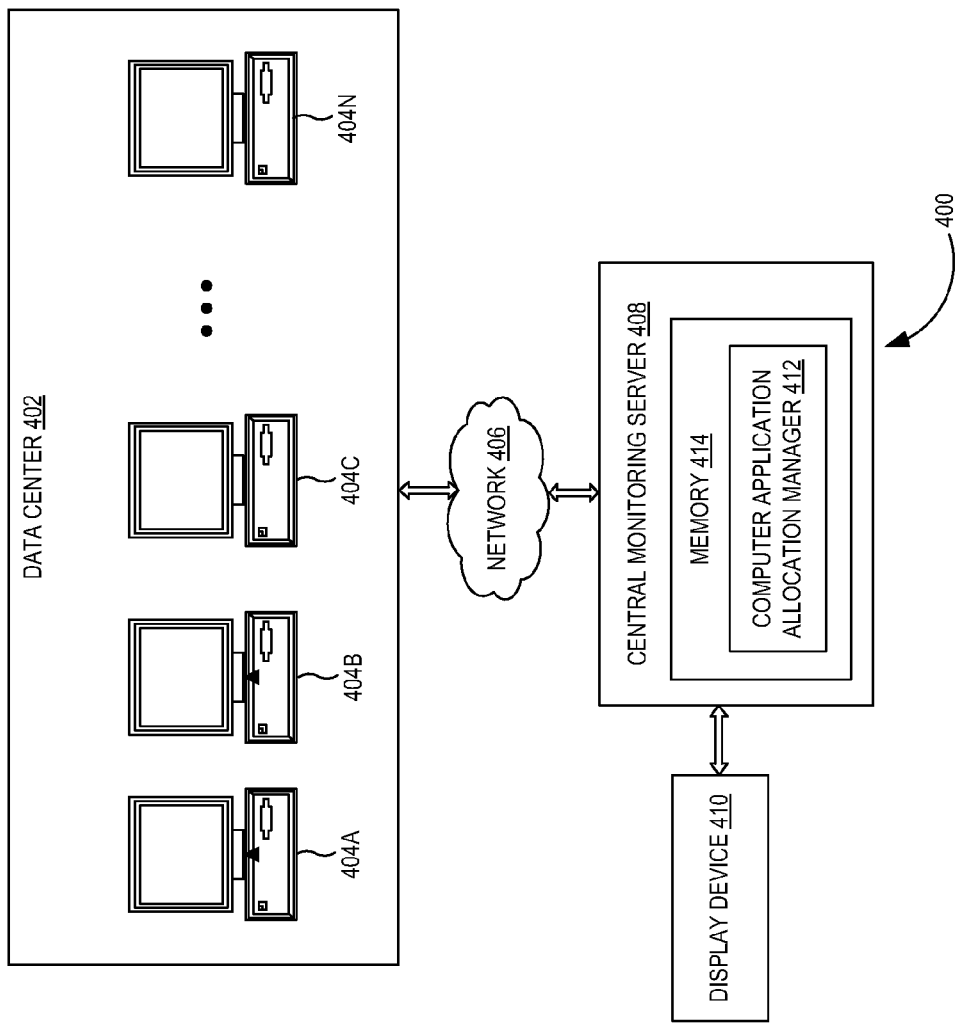
FIG. 4 illustrates a block diagram of a system for managing the computer applications running among the computing systems based on the resource usage volatility, according to one embodiment.

FIG. 4 illustrates a block diagram 400 of a system for managing the computer applications running among computing systems 404A-N based on the resource usage volatility, according to one embodiment. In particular, FIG. 4 shows a data center 402 including the computing systems 404A-N. Other exemplary computing systems may include cloud computing systems, partitioned computing systems, storage systems, storage networks, individual disk drives, and the like. The computing systems 404A-N are connected to a central monitoring server 408 via a network 406. The central monitoring server 408 includes a computer application allocation manager 412 residing in memory 414. The system also includes a display device 410 coupled to the central monitoring server 408. Each of the computing systems 404A-N includes resources such as CPU, memory and I/O.

In accordance with an embodiment of the present subject matter, the computer application allocation manager 412 monitors, analyzes and manages the computer applications running among the computing systems 404A-N based on resource usage in each of the computing systems 404A-N. The computer application allocation manager 412 analyzes statistical usage pattern of the computing systems 404A-N and determines a risk of resource saturation. For example, the statistical usage pattern is analyzed using the table 200 that includes the resource usage gains/losses computed at predetermined time periods, the computed mean and the computed volatility of the resource usage associated with each of the computing systems 404A-N.

The display device 410 displays results of analysis of the statistical usage pattern to the user. Based on the displayed results, the user may decide whether to move in new computer applications, move out the computer applications, or run the computer applications in the computing systems 404A-N. For example, the displayed results include the computed volatility of resource usage, the current resource usage, and the determined risk of resource saturation, as shown in the table 302.

Figure 5:
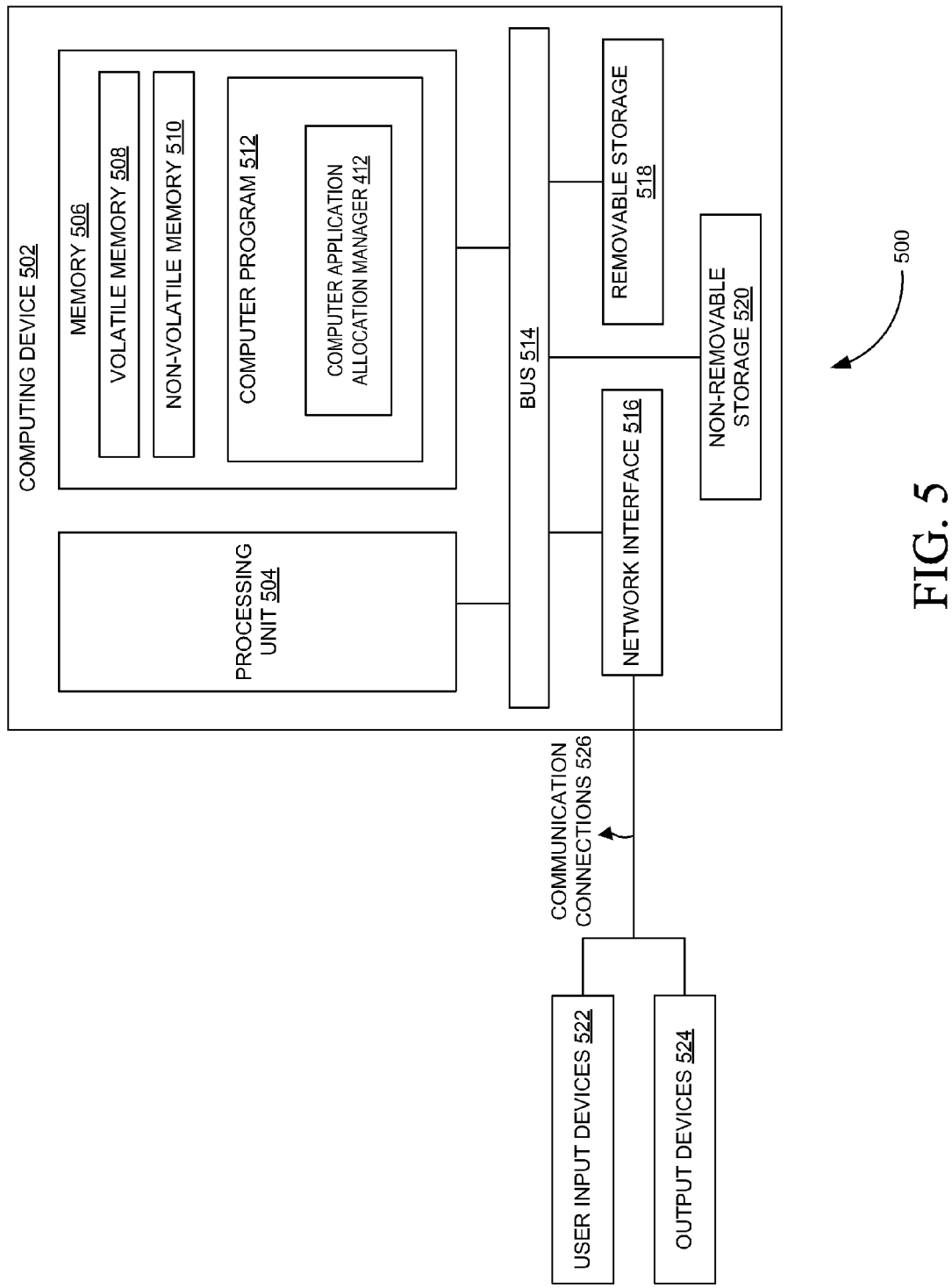
FIG. 5 illustrates an example of a suitable computing system environment for implementing embodiments of the present subject matter.

FIG. 5 shows an example of a suitable computing system environment 500 for implementing embodiments of the present subject matter. FIG. 5 and the following discussion are intended to provide a brief, general description of a suitable computing environment in which certain embodiments of the inventive concepts contained herein may be implemented.

A general computing device 502, in the form of a personal computer or a server may include a processing unit 504, memory 506, a removable storage 518, and a non-removable storage 520. The computing device 502 additionally includes a bus 514 and a network interface 516. The computing device 502 may include or have access to the computing system environment 500 that includes one or more user input devices 522, one or more output devices 524, and one or more communication connections 526 such as a network interface card or a universal serial bus connection.

The one or more user input devices 522 may be a digitizer screen and a stylus, trackball, keyboard, keypad, mouse, and the like. The one or more output devices 524 may be a display device of the personal computer or the server. The communication connections 526 may include a local area network, a wide area network, and/or other networks.

The memory 506 may include volatile memory 508 and non-volatile memory 510. A variety of computer-readable storage media may be stored in and accessed from the memory elements of the computing device 502, such as the volatile memory 508 and the non-volatile memory 510, the removable storage 518 and the non-removable storage 520. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processing unit 504, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 504 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processing unit 504 of the computing device 502. For example, a computer program 512 may include machine-readable instructions capable of managing computer applications running among computing systems based on resource usage volatility, according to the teachings and herein described embodiments of the present subject matter. In one embodiment, the computer program 512 may be included on a compact disk-read only memory (CD-ROM) and loaded from the CD-ROM to a hard drive in the non-volatile memory 510. The machine-readable instructions may cause the computing device 502 to encode according to the various embodiments of the present subject matter.

As shown, the computer program 512 includes the computer application allocation manager 412. For example, the computer application allocation manager 412 may be in the form of instructions stored on a non-transitory computer-readable storage medium. The non-transitory computer-readable storage medium having the instructions that, when executed by the computing device 502, may cause the computing device 502 to perform the one or more methods described in FIGS. 1 through 5.

In various embodiments, the systems and methods described in FIGS. 1 through 5 may enable a user to choose a best-suited computing system to move or run computer applications based on the statistical usage pattern analysis. The above-described systems and methods ensure that an increase or decrease in usage of resource(s) in the computing systems is reliably handled without affecting applications Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method for managing computer applications running among computing systems based on resource usage volatility, comprising:

computing resource usage gains/losses for each computing system at predetermined time periods based on resource usage of each computing system;

computing a volatility of resource usage for each computing system based on the computed resource usage gains/losses associated with each computing system, wherein the volatility of resource usage for each computing system corresponds to a standard deviation of the computed resource usage gains/losses associated with each computing system;

determining a current resource usage of each computing system;

determining a risk of resource saturation by comparing the computed volatility of resource usage with the determined current resource usage of each computing system; and managing the computer applications running among the computing systems using the determined risk of resource saturation associated with each computing system.

2. The method of claim 1, wherein computing the volatility of resource usage for each computing system based on the computed resource usage gains/losses associated with each computing system comprises:

computing a mean using the computed resource usage gains/losses for each computing system at the predetermined time periods; and computing the volatility of resource usage for each computing system based on the computed mean.

3. The method of claim 1, wherein computing the resource usage gains/losses for each computing system at predetermined time periods comprises:
   detecting and tracking the resource usage of each computing system at the predetermined time periods; and
   computing the resource usage gains/losses for each computing system at the predetermined time periods based on the detected and tracked resource usage.

4. The method of claim 1, wherein the resources are selected from the group consisting of CPU, I/O and memory.

5. The method of claim 1, wherein managing the computer applications running among the computing systems comprises managing operations selected from the group consisting of running the computer applications on one or more of the computing systems and moving the computer applications to the one or more of the computing systems.

6. A non-transitory computer-readable storage medium for managing computer applications running among computing systems based on resource usage volatility having instructions that, when executed by a computing device, cause the computing device to perform a method comprising:
   computing resource usage gains/losses for each computing system at predetermined time periods based on resource usage of each computing system;
   computing a volatility of resource usage for each computing system based on the computed resource usage gains/losses for each computing system, wherein the volatility of resource usage for each computing system corresponds to a standard deviation of the computed resource usage gains/losses associated with each computing system;
   determining a current resource usage of each computing system;
   determining a risk of resource saturation by comparing the computed volatility of resource usage with the determined current resource usage of each computing system; and
   managing the computer applications running among the computing systems using the determined risk of resource saturation associated with each computing system.

7. The non-transitory computer-readable storage medium of claim 6, wherein computing the volatility of resource usage for each computing system based on the computed resource usage gains/losses for each computing system comprises:
   computing a mean using the computed resource usage gains/losses for each computing system at the predetermined time periods; and
   computing the volatility of resource usage for each computing system based on the computed mean.

8. The non-transitory computer-readable storage medium of claim 6, wherein computing the resource usage gains/losses for each computing system at predetermined time periods comprises:
   detecting and tracking the resource usage of each computing system at the predetermined time periods; and
   computing the resource usage gains/losses for each computing system at the predetermined time periods based on the detected and tracked resource usage.

9. The non-transitory computer-readable storage medium of claim 6, wherein the resources are selected from the group consisting of CPU, I/O and memory.

10. The non-transitory computer-readable storage medium of claim 6, wherein managing the computer applications running among the computing systems comprises managing operations selected from the group consisting of running the computer applications on one or more of the computing systems and moving the computer applications to the one or more of the computing systems.

11. A system, comprising:
    a plurality of computing systems;
    a central monitoring server;
    memory coupled to the central monitoring server;
    a network communicatively coupled to the central monitoring server and the plurality of computing systems;
    a display device coupled to the central monitoring server and the network; and
    a computer application allocation manager residing in the memory, wherein the computer application allocation manager computes resource usage gains/losses for each computing system at predetermined time periods based on resource usage of each computing system, wherein the computer application allocation manager computes a volatility of resource usage for each computing system based on the computed usage gains/losses associated with each computing system, wherein the volatility of resource usage for each computing system corresponds to a standard deviation of the computed resource usage gains/losses associated with each computing system, wherein the computer application allocation manager determines a current usage of each computing system; wherein the computer application allocation manager determines a risk of resource saturation by comparing the computed volatility of resource usage with the determined current usage of each computing system, and wherein the display device displays the determined risk of resource saturation associated with each computing system that is used by a user to manage the computer applications running among the plurality of computing systems.

12. The system of claim 11, wherein the computer application allocation manager, in computing the volatility of resource usage for each computing system based on the computed resource usage gains/losses associated with each computing system, computes a mean using the computed resource usage gains/losses associated with each computing system at the predetermined time periods, and computes the volatility of resource usage for each computing system based on the computed mean.

13. The system of claim 11, wherein the computer application allocation manager, in computing the resource usage gains/losses for each computing system at predetermined time periods, detects and tracks the usage of each computing system at the predetermined time periods, and computes the resource usage gains/losses for each computing system at the predetermined time periods based on the detected and tracked resource usage.

14. The system of claim 11, wherein the computer application allocation manager manages resources selected from the group consisting of CPU, I/O and memory.

15. The system of claim 11, wherein the computer application allocation manager, in managing the computer applications running among the plurality of computing systems, manages operations selected from the group consisting of running the computer applications on one or more of the computing systems and moving the computer applications to one or more of the computing systems.

* * * * *